US006675659B1

(12) United States Patent
Louis-Calixte et al.

(10) Patent No.: US 6,675,659 B1
(45) Date of Patent: Jan. 13, 2004

(54) METHOD FOR MONITORING THE STATE OF A COMPOSITE STRUCTURE AND PRESSURIZED FLUID RESERVOIR HAVING A DEVICE PERFORMING SAID METHOD

(75) Inventors: Bruno Louis-Calixte, Bourges (FR); Frédéric Souvannavong, Bourges (FR); Manuel Angoulvant, Sainte Solange (FR)

(73) Assignee: Aerospatiale Matra, Paris (FR)

( * ) Notice: Subject to any disclaimer, the term of this patent is extended or adjusted under 35 U.S.C. 154(b) by 0 days.

(21) Appl. No.: 09/408,457

(22) Filed: Sep. 29, 1999

(30) Foreign Application Priority Data

Sep. 29, 1998 (FR) .............................. 98 12147

(51) Int. Cl.[7] .............................................. G01N 3/00
(52) U.S. Cl. ...................................................... 73/760
(58) Field of Search ........................ 73/760, 866, 774, 73/775, 789, 800, 588, 594, 579, 587, 768, 769, 786; 156/382; 428/195, 114, 461; 385/11, 12; 166/369, 259, 251; 702/36; 310/340, 334; 340/541

(56) References Cited

U.S. PATENT DOCUMENTS 4,856,335 A * 8/1989 Tornberg ...................... 73/597
5,493,898 A * 2/1996 Bilkhu et al. ................... 73/37
5,770,155 A * 6/1998 Dunphy et al. .......... 422/82.05
5,817,944 A * 10/1998 Chung .......................... 73/774
5,869,189 A * 2/1999 Hagood, IV et al. ....... 428/461
6,048,622 A * 4/2000 Hagood, IV et al. ....... 428/461

FOREIGN PATENT DOCUMENTS

| EP | 0 235 400 | 9/1987 |
| EP | 0 546 899 | 6/1993 |
| FR | 2688584 | 9/1993 |

* cited by examiner

*Primary Examiner*—Edward Lefkowitz
*Assistant Examiner*—Octavia Davis
(74) *Attorney, Agent, or Firm*—Thelen Reid & Priest LLP

(57) ABSTRACT

To monitor the operating state of a composite structure formed from at least two different materials and subject to a uniform force or load over its entire surface, the deformation at the interface between the two materials is measured. A comparison with a reference quantity of the structure, normally produced by the force applied thereto, indicates the operating state. When the composite structure forms the wall (14) of a reservoir (10), monitoring takes place in an instrumentation box (30) joined to the reservoir. When a critical threshold is exceeded, an alarm indicator (32) is triggered on the box (30).

51 Claims, 1 Drawing Sheet

METHOD FOR MONITORING THE STATE OF A COMPOSITE STRUCTURE AND PRESSURIZED FLUID RESERVOIR HAVING A DEVICE PERFORMING SAID METHOD

TECHNICAL FIELD

The invention mainly relates to a method for permitting the monitoring of the operating state of a composite structure formed from at least two different, superimposed materials, when the structure is subject to a uniform load or force, e.g. due to a pressure applied to its entire surface.

The invention also relates to a preferred application of said method to the monitoring of the operating state of the wall of a reservoir for containing a pressurized fluid (e.g. up to 500 bars).

PRIOR ART

When a reservoir is intended to contain a pressurized fluid, its wall is constructed in such a way that it is able to withstand the internal pressure exerted by the fluid.

When said mechanical resistance stress is coupled with a requirement for a relative lightness of the reservoir, an advantageous solution consists of making the reservoir wall from two different, superimposed materials. More specifically, a metallic, organic or composite envelope is externally covered with a reinforcement of long fibres embedded in a metal or resin matrix. The reinforcement can in particular be obtained by filamentary winding, followed by a polymerization cycle. The fibres can be wound in the form of a single ring or multidirectionally.

When the wall of a reservoir containing a pressurized fluid is constituted by such a structure, the latter can be damaged over a period of time, which then constitutes a safety hazard. In particular, the mechanical behaviour or strength of the composite reinforcement can decrease in time, under the effect of the use of the reservoir or harmful external effects.

EP-A-546 899 and FR-A-2 688 584 disclose methods making it possible to monitor the intrinsic damage state of a composite structure. These methods more specifically relate to the detection of possible delamination or separation defects between the layers of a composite structure formed from superimposed layers of fibres embedded in a resin matrix. A continuous, polarization-maintaining optical fibre serving as a sensor array is placed either between two layers of the composite structure, or between the actual structure and an associated section.

This optical fibre-based monitoring method is difficult to implement, because it is based on the use of an external optical installation. Therefore monitoring is discontinuous and requires a periodic immobilization of the structure in question.

Thus, such a monitoring method is unsuitable when it is wished to know in real time the damage state of a composite structure, without any immobilization thereof.

DESCRIPTION OF THE INVENTION

The present invention is specifically directed at a method for monitoring the operating state of a composite structure subject to a uniform force, e.g. due to a pressure applied to its entire surface and designed so as to ensure a real time monitoring, without necessitating the immobilization of the structure.

According to the invention, this result is achieved by means of a method for monitoring the state of a composite structure formed from at least two different materials superimposed along a given interface and subject to a uniform force over the entire surface thereof, characterized in that it comprises the following stages:

measurement of a deformation or stress level of the structure produced by said force at the interface, comparison of the measured deformation or stress level with a reference quantity (or a deformation, pressure level or stress level) of the structure, normally produced by said force.

In a preferred embodiment of the invention, the reference quantity is determined by measuring the deformation or stress level of part of the structure, formed from only one of said materials.

Preferably, the measured stress level or deformation and the reference quantity are compared with a reference curve giving the normal evolution of the deformation or stress level of the structure as a function of the force applied thereto.

The reference curve can in particular be obtained by measuring beforehand the evolution of the deformation or stress level of said compsite structure, in the new state, as a function of the force applied to said new structure.

In this case, there is advantageously a modelling of the reference curve by a second degree equation. This simplifies processing, because only two values corresponding to two parameters of the equation are then stored.

In order to measure the deformation or stress level of the part of the structure formed from a single material, use is made of at least one sensor or transducer, such as a strain gauge or any other deformation or stress transducer installed on said part.

In a comparable manner, measurement advantageously takes place of the deformation at the interface by means of at least one deformation or stress transducer, such as a strain gauge or piezoelectric sensor, installed at the interface of the composite structure.

The method according to the invention is advantageously applied to the monitoring of the state of a composite structure, whose different, superimposed materials comprise a metallic or organic or composite envelope and a reinforcement of long fibres embedded in a resin matrix.

The deformation transducer can then be integrated into the composite structure during the manufacture thereof, before making the reinforcement on the envelope.

In a preferred application of the method, the composite structure forms a reservoir able to contain a pressurized fluid.

The part of the structure formed by a single material is then a partition separating an inner area of the reservoir able to contain the pressurized fluid from an instrumentation box, preferably placed e.g. on the bottom of the reservoir.

In order to carry out a more complete monitoring or inspection of the composite structure, it is possible to advantageously measure at least one other quantity chosen from within the group including the temperature at the interface of the structure, the temperature in the immediate vicinity of the structure, the internal pressure of the reservoir, the possible shock or impact levels suffered by the reservoir, the time elapsed since a previous inspection, the time elapsed since the reservoir entered service, the "empty" and "full" states of the reservoir and the number of reservoir fillings.

In order to carry out these different measurements, use is made of monitoring means, such as sensors and electronic circuits, at least partly installed in the instrumentation box of the reservoir.

The invention also relates to a pressurized fluid reservoir comprising a composite wall formed from an internal envelope and on which is deposited a reinforcement of resin-impregnated, long fibres, superimposed along a given interface, characterized in that at least one deformation or stress transducer is integrated into the composite wall, at the interface between the envelope and the reinforcement or within said reinforcement, in order to permit a monitoring of the state of the wall, by comparison of the deformation or stress measured by the transducer with a reference quantity of the stress level or deformation of the wall, normally produced by the pressure of the fluid.

BRIEF DESCRIPTION OF THE DRAWINGS

A preferred embodiment of the invention is described in greater detail hereinafter relative to the attached drawings, wherein show.

DETAILED DESCRIPTION OF A PREFERRED EMBODIMENT OF THE INVENTION

Figure 1:
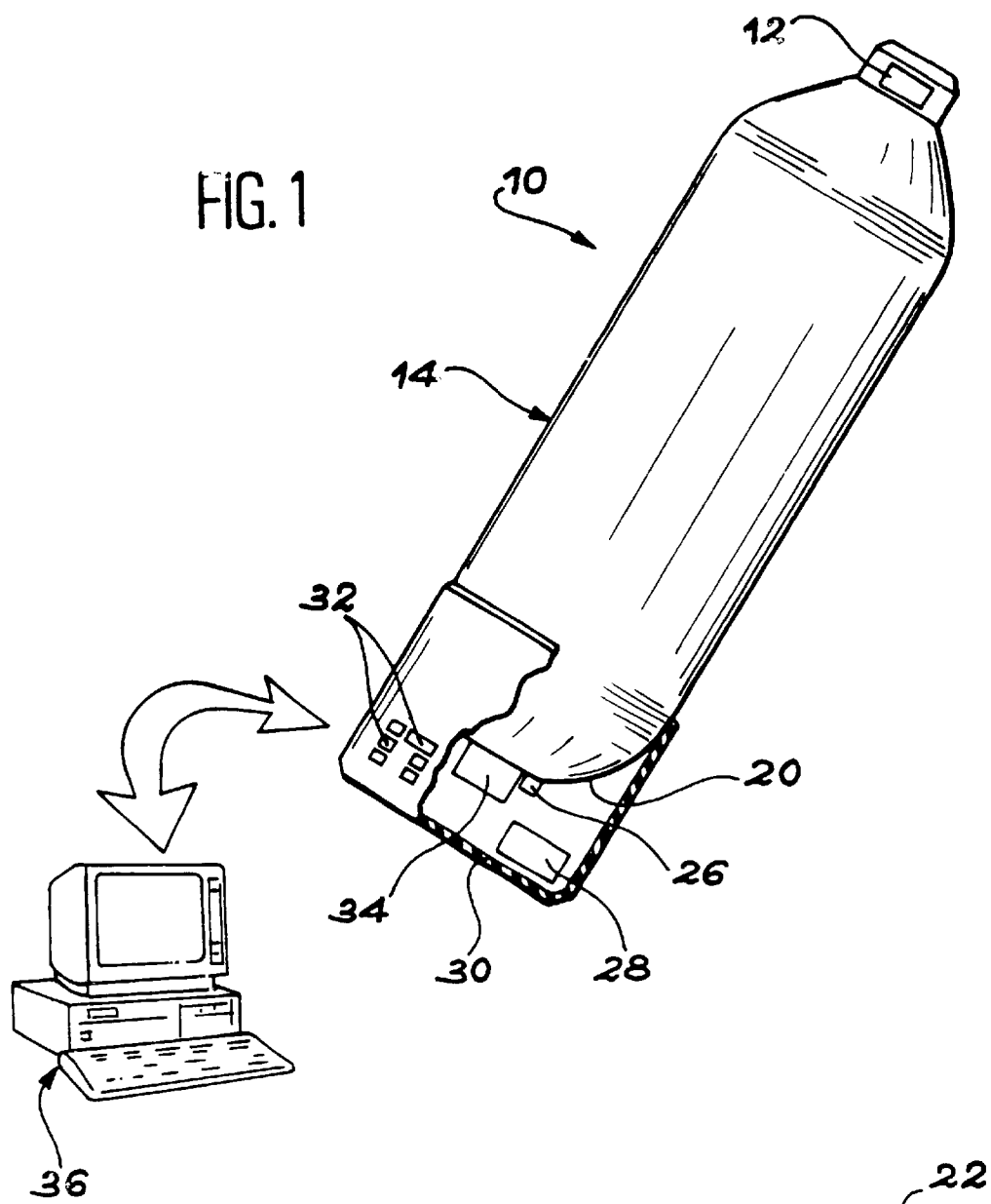
FIG. 1 A high pressure fluid reservoir equipped with a device according to the invention for monitoring the state of the composite structure forming the reservoir wall.

In FIG. 1, reference numeral 10 designates in general terms a bottleshaped reservoir. Said reservoir 10 is intended to contain a fluid, such as a pressurized gas. More specifically, it is intended to be filled and emptied a certain number of times over a period of time. To this end, it is equipped with connecting and closure means diagrammatically illustrated at 12.

In the embodiment shown, where the reservoir 10 is in the form of a cylindrical bottle, the connecting and closing means 12 are installed at the upper end of the bottle.

Figure 2:
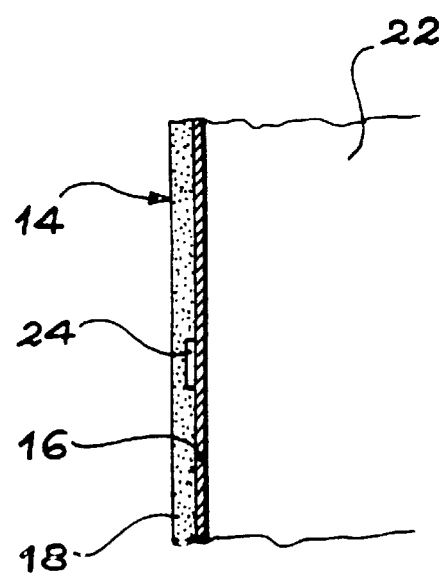
FIG. 2 A larger-scale sectional view showing part of the circumferential wall of the reservoir of FIG. 1.

As can be seen in FIG. 2, the wall 14 of the reservoir 10 comprises a metal envelope 16, covered over its entire surface with a reinforcement 18, except at the end of the reservoir bottom 20 (FIG. 1). In a variant, the metal envelope 16 can be replaced by an organic or composite envelope.

The reinforcement 18 is formed from long fibres embedded in a resin matrix. It is obtained by the filamentary winding of long, resin-impregnated fibres, either in order to form a single ring around the envelope 16, or multidirectionally. When the filamentary winding is ended, the reinforcement 18 undergoes a polymerization cycle. As a non-limitative illustration, said polymerization cycle can consist of raising the temperature to about 150° C. for approximately 3½ hours.

During the use of said reservoir 10, the composite structure forming the wall 14 is exposed to a uniform force or load over its entire surface, as a result of the presence of a pressurized gas in the inner area 22 of the reservoir.

In order to monitor the operating state and any damage to the composite structure forming the wall 14, according to the invention the reservoir 10 is equipped with means for monitoring said state. In the illustrated embodiment, said monitoring means also permit a certain number of ancillary measurements and checks, as will be apparent from the following detailed description.

Thus, the monitoring means equipped the reservoir 10 comprise one or more deformation or stress transducers or sensors 24 (FIG. 2), such as strain gauges and/or deformation or stress transducers installed in the wall 14 of the reservoir 10, at the interface between envelope 16 and reinforcement 18. The transducers 24 are integrated into the wall 14 during the manufacture of the latter. To this end, they are placed on the envelope 16 prior to the winding stage during which the reinforcement 18 is put into place.

More specifically, the transducers 24 are integrated into the circumferential part of the wall 14 which will be subject to the greatest deformations or stresses when the pressure varies in the inner area 22 of the reservoir 10. Thus, they permanently measure the deformation or stress level of the wall 14 produced by the pressure prevailing in the reservoir 10. The deformation or stress level measured by the transducer 24 is also partly due to the deterioration of the composite material forming the wall 14, when such a deterioration exists.

The difference measured by the transducer 24 when compared with the reference quantity gives information on the operating state of the wall 14.

In order to carry out such a comparison, the reservoir 10 is equipped with at least one other deformation or stress transducer 26, such as a strain gauge or piezoelectric sensor, which is placed on the bottom 20 of the reservoir 10, i.e. on part of the wall 14 in which the envelope 16 has no reinforcement 18. Due to the absence of a reinforcement 18 in the bottom 20, the deformations thereof, detected by the transducer 26, are not modified by any damage to the composite structure 16. In other words, the transducer 26 measures a quantity perfectly representing the pressure level in the interior of the reservoir 10. A comparison of the signals supplied by the transducers 24 and 26 consequently makes it possible to detect that part of the deformation of the wall 14 measured by the transducers 24 which is due solely to damage to the composite structure of the wall.

In order to carry out said comparison, the reservoir 10 is also equipped with means for monitoring its state and which are installed on an electric card or board 28, which is itself located in an instrumentation box 30 forming an integral part of the reservoir 10. More specifically, the instrumentation box 30 is tightly fixed to the wall 14 of reservoir 10, so as to entirely cover its bottom 20. Thus, the deformation transducer 26 is also placed within the instrumentation box 30.

More specifically, the electronic board 28 has a memory in which is recorded a reference curve giving the normal evolution of the quantity or deformation of the composite structure forming the reservoir wall 14, as a function of the force applied to said structure as a result of the internal pressure. Said reference curve is experimentally obtained on the reservoir in the new state, by measuring the evolution of the deformation of the composite structure as a function of the internal pressure of the reservoir, i.e. as a function of the force applied to the composite structure.

The electronic board 28 also has a circuit for processing output signals supplied by the transducers 24 and 26. This circuit permanently checks that the signals supplied by the transducers evolve in accordance with the stored reference function. When said signals no longer evolve in accordance with the reference curve, the event is retrieved and processed. Said processing can include a storage of said event (date and extreme value reached) and the triggering of an alarm indicator 32 located on the box 30 and visible from the outside or transmission to an external system.

In the preferred embodiment shown, the monitoring means associated with the reservoir 10 also make it possible to monitor the additional, following quantities:

temperature within the composite structure, temperature in the immediate environment of the reservoir, "empty" and "full" states of the reservoir, non-exceeding of a critical pressure, number of reservoir fillings, level of shocks and possible directions suffered by the reservoir, time elapsed since a routine inspection, time elapsed since the reservoir entered service.

To measure the temperature in the composite structure forming the wall 14, it is possible to install one or more, not shown temperature sensors, such as a thermistor, thermocouple or the like, at the interface between the envelope 16 and the reinforcement 18. These temperature sensors are put into place during the manufacture of the composite structure forming the wall 14, in the same way as the transducers 24.

It should be noted that all the transducers and sensors integrated into the wall 14 are chosen so as to be able to withstand the manufacturing cycle of the reinforcement 18 forming the outer part of the wall 14.

Another, not shown temperature sensor such as a thermistor, thermocouple or the like, is installed in the instrumentation box 30 to measure the temperature in the immediate environment of the bottle. In a certain number of applications, the latter temperature sensor can be considered as adequate. The temperature sensors integrated into the composite structure forming the wall 14 are then omitted.

One of the circuits equipping the autonomous electronic board 38 then compares the temperature or temperatures measured by the temperature sensors with two previously defined temperature thresholds, namely top and bottom, which define the authorized use range of the reservoir 10. Comparison takes place on a permanent basis. When one of the thresholds is exceeded, the event is retrieved and processed, i.e. it is e.g. stored and transmitted to an alarm indicator 32.

It should be noted that the temperatures measured by the temperature sensor or sensors installed on the reservoir 10 can also be used for correcting the other quantities measured by the monitoring means equipping said reservoir.

The signals supplied by the sensors or transducers 24 and 26 are also used for detecting the "empty" and "full" states of the reservoir, as well as the non-exceeding of a critical pressure.

Thus, the "empty" and "full" states of the reservoir are logged in the electronic board 28 by clearing two "high" and "low", previously defined pressure thresholds. A not shown counter located in the instrumentation box 30 is incremented on each occasion where the internal pressure of the reservoir 10 successively clears the "bottom" threshold and then the "top" threshold. Beyond a previously defined number of fillings, the event is retrieved and processed, e.g. by a storage and display on a display 32 of the instrumentation box 30.

The detection of the "top" pressure threshold, coupled with a not shown, internal clock, such as an electronic clock installed in the instrumentation box 30, is also used for determining the effective operating time in the "full" state of the reservoir 10.

An identical device to that described hereinbefore ensures that the internal pressure does not exceed a previously defined, critical pressure. If this threshold is exceeded, the event is retrieved and processed.

An accelerometer 34, such as a three-dimensional shock transducer or three, single shock transducers, fixed to the bottom 20 of the reservoir 10 is used for measuring the levels of shocks and possible directions within the reservoir. The values obtained are compared with maximum, previously defined values in a circuit provided for this purpose on the autonomous electronic board 28. The value of the admissible thresholds is a priori dependent on the direction, because the damping of the shock is dependent on the struck area. If one of the thresholds is reached, the event is retrieved and processed.

The internal clock housed in the instrumentation box 30 counts down the time which has elapsed since the last routine inspection and compares it with an authorized, maximum time period. During each inspection, the periodic counter is reset to zero. When the maximum duration is exceeded, the event is retrieved and processed.

The internal clock also calculates the use period of the reservoir 10 as from its entering service and without any possibility of resetting to zero. Thus, the counter transmits the time which has elapsed since the end of reservoir manufacture. When the authorized life is exceeded, the event is retrieved and processed.

It should be noted that all the previously defined values characterizing the above-described monitoring means can be set at the time the reservoir is put into service.

As is very diagrammatically illustrated in FIG. 1, the monitoring means equipping the reservoir 10 can be programmed and operated, apart from the alarm indicators 32 ensuring a real time information, by the connection of the electronic board 28 to an external operating system, e.g. an external computer 36. This connection can be permanent or performed during the periodic inspections of the reservoir, as well as prior to its entry into service.

It should be noted that the means for monitoring the deterioration state of the composite structure forming the wall 14, as well as the corresponding monitoring method, are not limited to the application described, i.e. to the case where the composite structure forms the wall of a reservoir containing a pressurized fluid. The method and device can also be used for monitoring any other composite structure subject to a uniform, overall force and constituted by at least two different materials having an interface.

Moreover, in the case where the method according to the invention is applied to a reservoir, the monitoring means can have the sole function of monitoring the deterioration state of the composite without passing outside the scope of the present invention.

What is claimed is:

1. A method for monitoring in situ over a period of time a composite structure having a given total surface and comprising at least a first part including at least two layers formed from different materials and adjacent one another along a given interface, said structure being subject to a uniform pressure applied over said total surface, said method comprising the following stages:

measuring in situ at a time t a deformation or stress level of said structure, produced by said uniform pressure by a monitoring means positioned at said interface; and comparing the measured deformation or stress level with a reference deformation or stress level of said structure at a time $t_0$, produced by said uniform pressure.

2. The method according to claim 1, further comprising a stage of determining the reference deformation or stress level by measuring a deformation or stress level of a second part of the structure formed from only one of said layers.

3. The method according to claim 1, wherein said comparison stage comprises comparing the measured deformation or stress level and the reference deformation or stress level with a reference curve giving a normal evolution of the deformation or stress level of the first part of the structure as a function of the force applied thereto.

4. The method according to claim 3, further comprising a stage of obtaining the reference curve by measuring beforehand an evolution of the deformation or stress level of said first part of the structure, when said structure is new, as a function of the force applied to said new structure.

5. The method according to claim 3, further comprising a stage of modeling the reference curve by a second degree equation.

6. The method according to claim 2, wherein said stage of determining the reference deformation or stress level by measuring the deformation or stress level of the second part of the structure is performed by installing at least one transducer on said second part.

7. The method according to claim 1, wherein said in situ measurement stage is performed by installing the monitoring means in the form of at least one transducer at said interface.

8. The method according to claim 7, wherein said in situ measurement stage is performed by installing the transducer at the interface between an envelope and a reinforcement of long fibres embedded in a resin matrix.

9. The method according to claim 8, wherein the transducer is integrated into the composite structure during a manufacturing of said structure prior to producing the reinforcement on the envelope.

10. The method according to claim 2, for monitoring the state of a composite structure forming a reservoir able to contain a pressurized fluid.

11. The method according to claim 10, wherein said further stage of determining the reference deformation or stress level is performed by measuring the deformation or stress level of a partition separating an internal area of the reservoir able to contain the pressurized fluid from an instrumentation box.

12. The method according to claim 11, wherein the instrumentation box is placed on a bottom of the reservoir.

13. The method according to claim 11, further comprising a stage of measuring at least one other quantity chosen from within a group including a temperature at the interface of the structure, a temperature in an immediate vicinity of the structure, an internal pressure of the reservoir, possible shock levels suffered by the reservoir, a time which has elapsed since a previous inspection, a time which has elapsed since the reservoir has entered service, "empty" and "full" states of the reservoir and a number of fillings thereof.

14. The method according to claim 13, wherein said further stage of measuring at least one other quantity is carried out by installing a monitoring means at least partly in the instrumentation box.

15. A pressurized fluid reservoir comprising:
at least a first part formed from a composite wall formed from an envelope and a reinforcement of long, resin-impregnated fibres adjacent one another along a given interface; and
at least one first transducer integrated into the composite wall at the interface between the envelope and the reinforcements, so as to permit an in situ monitoring of a state of the wall, by comparing a stress level or deformation measured by the first transducer with a reference stress level or deformation of the wall, produced by the uniform pressure of the fluid applied over a total surface of the pressurized fluid reservoir.

16. The reservoir according to claim 15, wherein at least one second transducer is installed on a second part of the reservoir, comprising only said envelope, said second transducer being adapted to measure a stress level or deformation of said second part.

17. The reservoir according to claim 16, wherein said second part is a partition separating an internal area of the reservoir able to contain the fluid from an instrumentation box.

18. The reservoir according to claim 17, wherein said partition forms a bottom of the reservoir.

19. The reservoir according to claim 17, wherein the instrumentation box contains means for monitoring said state of the wall, connected to the first transducer and to the second transducer.

20. A method for monitoring the state of a composite structure, the method comprising the steps of:
exposing the composite structure to a uniform non pressure applied over a total surface of the composite structure, the composite structure having an envelope layer and a reinforcement layer adjacent the envelope layer forming an interface between the envelope layer and reinforcement layer, said envelope layer and said reinforcement layer having different materials;
measuring a deformation or stress level of the composite structure at the interface; and
comparing the measured deformation or stress level of the composite structure at the interface with a reference quantity.

21. The method according to claim 20, wherein the reference quantity is determined by measuring the deformation or stress level of a part of the structure formed from only the envelope layer.

22. The method according to claim 20, wherein the measured deformation or stress level and the reference quantity are compared with a reference curve giving a normal evolution of the deformation or stress level of the structure as a function of the force applied thereto.

23. The method according to claim 22, wherein the reference curve is obtained by measuring beforehand the evolution of the deformation or stress level of said composite structure, in a new state, as a function of the force applied to said new structure.

24. The method according to claim 22, wherein the reference curve is modeled by a second degree equation.

25. The method according to claim 21, wherein the deformation or stress level of the composite structure is measured by at least one transducer installed on the part of the structure formed from only the envelope layer.

26. The method according to claim 20, wherein the deformation or stress level of the composite structure is measured by at least one transducer installed at the interface of the composite structure.

27. The method according to claim 26, wherein at least one transducer is integrated into the composite structure during manufacturing of the envelope layer prior to producing the reinforcement layer on the envelope layer.

28. The method according to claim 20, wherein the composite structure forms a reservoir able to contain a pressurized fluid.

29. The method according to claim 28, wherein a part of the structure is a partition separating an internal area of the reservoir able to contain the pressurized fluid from an instrumentation box.

30. The method according to claim 29, wherein the instrumentation box is placed on a bottom of the reservoir.

31. The method according to claim 28, further comprising a stage of measuring at least one other quantity chosen from within the group including the temperature at the interface of the structure, a temperature in the immediate vicinity of the structure, an internal pressure of the reservoir, the possible shock levels suffered by the reservoir, a time which has elapsed since a previous inspection, a time which has elapsed since the reservoir has entered service, an "empty" and "full" states of the reservoir, and a number of fillings thereof.

32. The method according to claim 31, wherein said further stage of measuring is carried out with the aid of a monitoring means at least partly installed in the instrumentation box.

33. A method for monitoring the state of a composite structure, the method comprising the steps of:
   exposing the composite structure to a uniform pressure applied over a total surface of the composite structure, the composite structure formed from at least two different materials adjacent one another along a given interface;
   measuring a deformation or stress level of the composite structure at the interface; and
   comparing the measured deformation or stress level of the composite structure at the interface with a reference quantity.

34. The method according to claim 33, wherein the reference quantity is determined by measuring the deformation or stress level of a part of the structure formed from only one of the materials.

35. The method according to claim 33, wherein the measured deformation or stress level and the reference quantity are compared with a reference curve giving a normal evolution of the deformation or stress level of the structure as a function of the force applied thereto.

36. The method according to claim 35, wherein the reference curve is obtained by measuring beforehand the evolution of the deformation or stress level of said composite structure, in a new state, as a function of the force applied to said new structure.

37. The method according to claim 35, wherein the reference curve is modeled by a second degree equation.

38. The method according to claim 34, wherein the deformation or stress level is measured by at least one transducer installed on the part of the structure formed from only one of the materials.

39. The method according to claim 33, wherein the deformation or stress level of the composite structure is measured by at least one transducer installed at the interface of the composite structure.

40. The method according to claim 39, applied to the monitoring of the state of the composite structure, whose different adjacent materials comprise an envelope and a reinforcement of long fibres embedded in a resin matrix.

41. The method according to claim 40, wherein at least one transducer is integrated into the composite structure during manufacturing of the envelope layer prior to producing the reinforcement layer on the envelope layer.

42. The method according to claim 33, wherein the composite structure forms a reservoir able to contain a pressurized fluid.

43. The method according to claim 42, wherein a part of the structure is a partition separating an internal area of the reservoir able to contain the pressurized fluid from an instrumentation box.

44. The method according to claim 43, wherein the instrumentation box is placed at a bottom of the reservoir.

45. The method according to claim 42, further comprising a stage of measuring at least one other quantity chosen from within the group including the temperature at the interface of the structure, a temperature in the immediate vicinity of the structure, an internal pressure of the reservoir, the possible shock levels suffered by the reservoir, a time which has elapsed since a previous inspection, a time which has elapsed since the reservoir has entered service, an "empty" and "full" states of the reservoir, and a number of fillings thereof.

46. The method according to claim 45, wherein said further stage of measuring is carried out with the aid of a monitoring means at least partly installed in the instrumentation box.

47. A container for containing a pressurized fluid, the container comprising:
   an envelope layer;
   a reinforcement layer of long resin-impregnated fibers adjacent the envelope layer along an interface, said envelope layer and said reinforcement layer having different materials; and
   a first transducer positioned at the interface to permit in situ monitoring of a state of the interface,
   wherein the container is subject to uniform pressure applied over a total surface of the container.

48. The container according to claim 47, wherein at least one second transducer is installed on a partition of the reservoir, which is free from any reinforcement, in order to measure the deformation or stress level of said partition.

49. The container according to claim 48, wherein said partition separates an internal area of the reservoir able to contain the fluid from an instrumentation box.

50. The container according to claim 48, wherein said partition forms a bottom of the reservoir.

51. The container according to claim 49, wherein the instrumentation box contains a means for monitoring a state of the reservoir, and is connected to the first transducer and to the second transducer.

* * * * *